(No Model.)
A. TWYMAN.
CAR TRUCK CONNECTION.
No. 395,859. Patented Jan. 8, 1889.
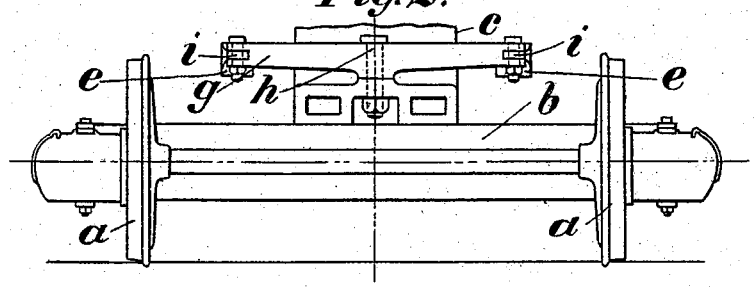
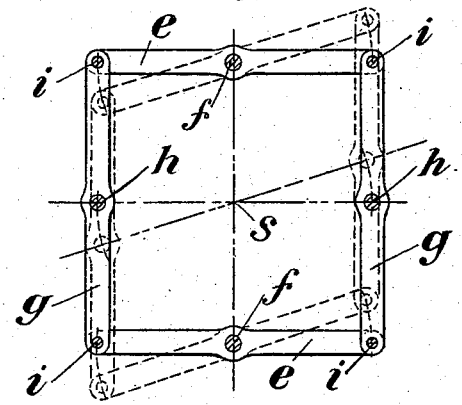
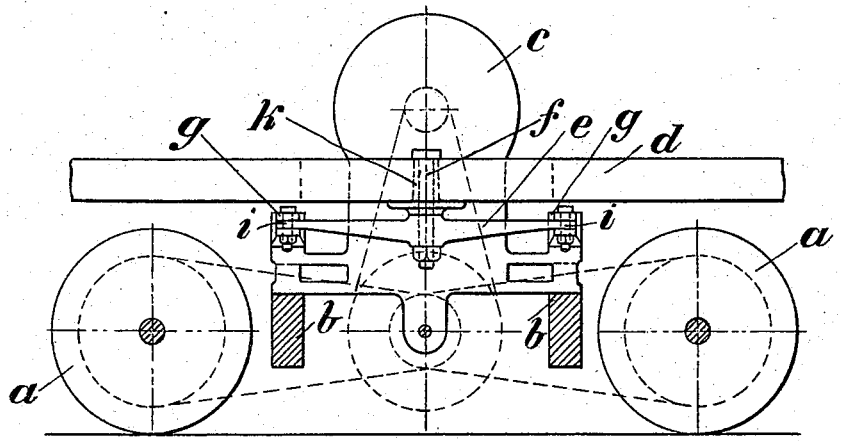
WITNESSES
INVENTOR
Aaron Twyman

UNITED STATES PATENT OFFICE.

AARON TWYMAN, OF PULLMAN, ILLINOIS.

CAR-TRUCK CONNECTION.

SPECIFICATION forming part of Letters Patent No. 395,859, dated January 8, 1889.

Application filed January 16, 1888. Serial No. 260,895. (No model.)

*To all whom it may concern:*

Be it known that I, AARON TWYMAN, of Pullman, in the county of Cook and State of Illinois, have invented a new and useful Improvement in Railroad Car and Truck Connections, of which the following is a full, clear, and exact description.

This invention is more particularly designed to be applied to that description of railroad passenger-cars which contain within themselves the apparatus used in their propulsion—as, for instance, cars carrying a steam, electric, or other motor, or having apparatus or devices within them which may be either directly or indirectly attached to an outside propelling means or power, as in the case of cable-grip cars. The invention provides, as will be hereinafter shown, for attaching a car-body to a truck in such a manner as to leave an open space at the center of or within the attachment, which open space may be utilized for the convenient placing of a motor or grip, or for any other purpose.

In cars constructed to be carried upon independent trucks it is usual to connect the car-body to the truck by means of center plates, one of which is attached to the truck and the other to the body of the car, and which, being provided with convenient bearing-surfaces, carry the superincumbent weight of the car upon the central part of the truck, and, being in contact, have combined with them a king-bolt, the whole being designed to form a pivot or pivotal point around which the truck may swivel or rotate when passing around curves in the track upon which the car is running. To prevent the undue oscillation of the car upon the truck, various means have been provided, including two auxiliary bearing-plates upon the truck, one upon each side, known as "side bearings," and two upon the car-body, or, instead of these side bearing plates, side bearing wheels have been used.

My invention consists in a system of parallel or jointed bars connecting the truck with the car-body around or outside of the pivotal center of motion of the truck, whereby the king-bolt and center plates are dispensed with and a central or open space left at such place, and whereby, also, special or separate side bearings may or may not be used, and the jointed-bar connection be employed, if desired, to support the car; but the primary action of said connection is to tie the car in a central position relatively to the truck and to provide for the turning or swiveling of the truck around a central or pivotal point or axis within said jointed-bar connection, substantially as hereinafter described.

Reference is to be had to the accompanying drawings, forming a part of this specification, in which similar letters of reference indicate corresponding parts in all the figures.

Figure 1 is a longitudinal sectional elevation of a railroad-car and four-wheeled truck in part, with my invention applied, and showing the frame of a motor mounted upon the truck and partly projecting up into the car or through the floor thereof. Fig. 2 is an end view of the truck and showing the jointed-bar connection or attachment of the truck to the car-body. Fig. 3 is a plan view of the jointed bar-connection detached.

The wheels $a$ $a$ of the truck, with their axles, journals, and bearings, are or may be arranged in the usual manner with side frames carrying the transoms $b$ $b$, which support the frame $c$ of a propelling-motor or other device, which it may be found convenient to attach to the truck and the body of the car, the floor-framing only of which is shown at $d$.

The jointed-bar connection between the car and truck, as here represented, consists in part of two bars, $g$ $g$, supported at their centers and pivoted intermediately of their length upon pins $h$ $h$, and of two other bars, $e$ $e$, jointed at their ends by connecting-pins $i$ $i$ $i$ $i$ with the ends of the bars $g$ $g$, the floor-framing $d$ of the car being furnished with socket-plates $k$, (one of which only is here shown,) supported on the centers of the bars $e$ $e$, or attached to the bars $e$ $e$ by pins $f$ $f$. This system of jointed bars constitutes a combination of parallel bars arranged outside of or around the pivotal center of motion of the truck, $s$, in Fig. 3, indicating such center of motion.

The bars $e$ $e$ and $g$ $g$ are held in their proper double parallel relation—that is, the two bars $e$ $e$ with one another and the two bars $g$ $g$ with each other—by the pins *h h*, attached to the truck-frame, and the pins or connections *f f*, attached to the car-body. The space between the several bars is left open or free for the insertion of a motor, gripping devices, or for any other purpose that may be desired. With or by this jointed-bar connection between the truck and the car-body it will be seen that, although the center of the truck, which forms the pivotal axis, remains fixed in its horizontal relation with the car-body, the truck is free to swivel or rotate around this central fixed or pivotal point to the extent requisite in passing around curves in the track upon which the car may be running, the motion or action of said bars being illustrated by dotted lines in Fig. 3.

The combined bars *e e* and *g g* may be used for the purpose of sustaining the car, as shown where the pins *f* are in extended socketed connection with the car, as well as for holding the car on a central position upon the truck, or said bars may be used only for the latter purpose and the car be carried by side bearings resting independently upon the truck, or by other means.

The invention is not restricted to a like connection of the car at both of its ends, but may be applied either to a car running upon four-wheeled trucks, for instance, or to a car having a four-wheeled truck at one end, while its other end is otherwise carried.

Having thus described my invention, what I claim as new, and desire to secure by Letters Patent, is—

1. In railroad car and truck connections, the combination, with the car and truck, of a series of bars pivoted or jointed to one another around or outside of the center of the swiveling motion of the truck, to form an open central space, and pivoted, respectively, in sets, one to the car-body and another to the truck, substantially as specified.

2. In railroad car and truck connections, the combination, with the car and truck, of the within-described system or series of bars arranged in pairs in crossing relation with each other, to form an open central space, and pivoted to each other at their ends, the one pair of bars being pivotally connected intermediately of their length to the truck and the other pair of bars having each combined with them a socket and pin arranged to connect them intermediately of their length with the car-body, whereby the car is not only held in a central position upon the truck, but the bars may be made to sustain the weight of the car, essentially as shown and described.

3. In railroad car and truck connections, the combination, with the truck, of the car having an opening in its bottom or floor arranged over the center of the truck, and a series of parallel or crossing bars arranged in relation with said opening, to form an open central space thereunder, and pivoted or jointed to each other, also pivoted or connected intermediately of their length in pairs to the car and truck, substantially as and for the purpose or purposes herein set forth.

AARON TWYMAN.

Witnesses:
    E. B. CURTISS,
    E. C. TOURTELOT.